UNITED STATES PATENT OFFICE.

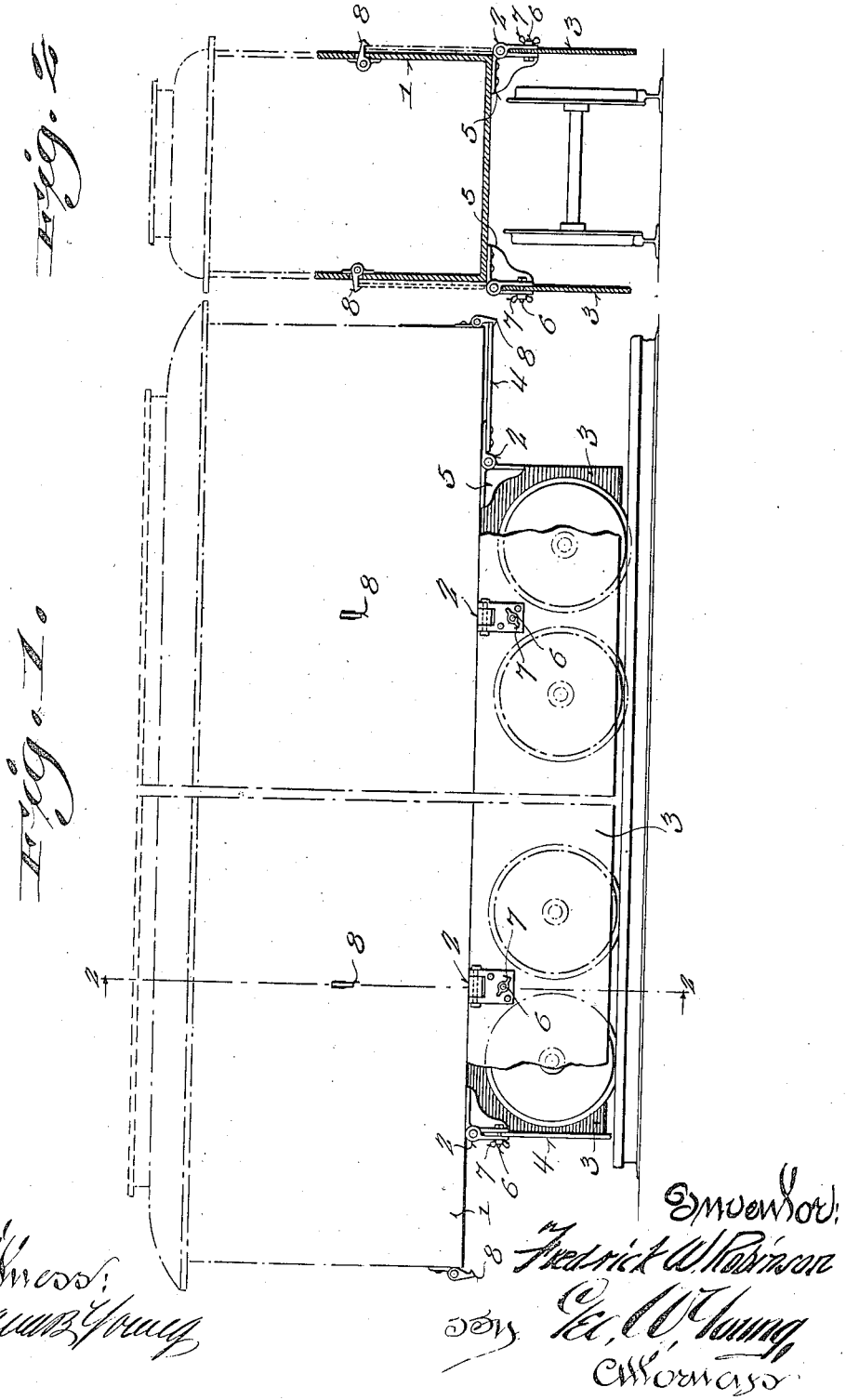

FREDRICK W. ROBINSON, OF MILWAUKEE, WISCONSIN.

MUFFLER.

1,175,084.   Specification of Letters Patent.   Patented Mar. 14, 1916.

Application filed June 25, 1915. Serial No. 36,292.

*To all whom it may concern:*

Be it known that I, FREDRICK W. ROBINSON, a citizen of the United States, and resident of Milwaukee, in the county of Milwaukee and State of Wisconsin, have invented certain new and useful Improvements in Mufflers; and I do hereby declare that the following is a full, clear, and exact description thereof.

My invention relates to the subject of vehicles, and it has specially in view means whereby noises made by vehicles may be reduced to the minimum.

My invention contemplates in its general organization the equipping of vehicles with sound mufflers which may be in the form of curtains, shields, and the like that are so disposed that they will interrupt and effectively muffle sound waves produced by the vehicle, the mufflers being preferably of such a nature that they may be readily attached to or removed from the vehicle, and if desired, may be so connected to the vehicle that they may be placed in inoperative positions, this in some instances being of advantage in that it permits access to portions of the vehicle that are normally inaccessible without the necessity of removing the mufflers from the vehicle.

In producing an invention capable of performing the functions generally stated above, it will, of course, be readily apparent that the same may be embodied in many forms, one practical example being shown in the accompanying drawings wherein—

Figure 1 is a view in side elevation of a street car equipped with sound mufflers embodying the principle of my invention, parts thereof being broken away. Fig. 2 is a transverse vertical sectional view, taken substantially on the line 2—2, Fig. 1.

In the accompanying drawings a conventional representation of a railway car has been shown to illustrate one practical method of eliminating the noises therefrom, although it is to be understood that in so far as details, structural arrangements, and application, the invention is not limited to the form or use shown.

Referring to the drawings 1 designates a railway car having hinges 2 at its sides and ends, the hinges carrying the side and end curtains, shields, or other type of mufflers 3 and 4, respectively, the mufflers hanging from their hinges vertically beyond the outer sides and the outer ends of the running gear of the car. Brackets 5 may be carried by the vehicle and have flat portions that contact with the inner surfaces of the mufflers to serve as braces for holding the mufflers in position to muffle the noises from the car, and such braces may be equipped with bolts that extend through the mufflers and the hinges, as indicated by the numeral 6, and be engaged by the nuts 7 for making the connection between the braces and the mufflers a firm yet readily detachable one. The described manner of connecting the mufflers to the car is an advantageous one, in that by releasing the nut 7 and bolt 6, the mufflers may be swung outwardly and upwardly against the car body and be engaged by the gravity or other form of latches 8 and by said latches held in such positions that access may be readily had to the running gear.

From the foregoing description, it will be apparent that my invention provides simple means whereby the mufflers are located in positions to effectively muffle the sounds from a vehicle, and in this connection it is to be noted that while the invention is readily adaptable for all classes of vehicles, it is one that is of great value in connection with railway cars of the elevated type as such cars are exceedingly noisy.

It is to be understood that with a noise muffler it is advisable to make provision for lateral movements relative to the car to compensate for the relative positions of the vehicle body and trucks when the vehicle is rounding a curve. In such instances, as is well known, the wheels at one side project laterally beyond the body. Various expedients could be resorted to for preventing the projecting wheels contacting with the muffler in such instances, a simple one being as shown in the drawings wherein the braces 5 only engage a part of the upper portion of the muffler and such arrangement obviously permits the free portions of the mufflers to swing outwardly clear of the wheels.

I claim as my invention:—

1. In combination with a vehicle, noise mufflers having their upper edge portions hinged thereto, and braces depending from the vehicle and having rigid but detachable connections with the upper edges of said mufflers.

2. In combination with a vehicle, noise mufflers having hinge connections with the vehicle and inclosing the running gear thereof, the lower edge portion of said mufflers being free to permit the same to swing outward relative to the car, braces depending from the vehicle and having flat surfaces for engaging the upper portions of said mufflers, and detachable means for fastening the upper portions of the mufflers to the flat surfaces of the braces.

3. A noise muffler for vehicles comprising hinge castings adapted to be secured to the body of a vehicle, curtains hinged to said castings and means carried by the castings for detachably holding the curtains against pivotal movement.

4. A noise muffler for vehicles, comprising side curtains hinged to the sides of the vehicle outwardly of and adjacent the planes of the sides of the vehicle and adapted to swing upwardly at the sides of the vehicle, detachable holding means for the curtains in such position carried by the sides of the vehicle, end curtains hinged to the vehicle inwardly of the ends thereon adapted to swing upwardly against the bottom of the vehicle, and detachable holding means for the end curtains in such positions.

In testimony that I claim the foregoing I have hereunto set my hand at Milwaukee, in the county of Milwaukee and State of Wisconsin, in the presence of a witness.

FREDRICK W. ROBINSON.

Witness:
M. E. DOWNEY.